(12) United States Patent
Osakabe et al.

(10) Patent No.: US 8,643,909 B2
(45) Date of Patent: *Feb. 4, 2014

(54) IMAGE READER

(75) Inventors: Yoshinori Osakabe, Aichi (JP);
Takayuki Akimatsu, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 493 days.

This patent is subject to a terminal disclaimer.

(21) Appl. No.: 13/035,071

(22) Filed: Feb. 25, 2011

(65) Prior Publication Data

US 2011/0211235 A1 Sep. 1, 2011

(30) Foreign Application Priority Data

Feb. 26, 2010 (JP) ................................ 2010-042579

(51) Int. Cl.
*H04N 1/407* (2006.01)
(52) U.S. Cl.
USPC ........................................................ 358/3.26
(58) Field of Classification Search
None
See application file for complete search history.

(56) References Cited

U.S. PATENT DOCUMENTS

| 5,463,451 | A | * | 10/1995 | Acquaviva et al. | ........... 399/211 |
| 5,592,576 | A | * | 1/1997 | Hayashi | ........ 382/318 |
| 7,796,310 | B2 | | 9/2010 | Hasegawa et al. | |
| 2002/0039207 | A1 | | 4/2002 | Kanda | |
| 2006/0023267 | A1 | | 2/2006 | Ikeno et al. | |
| 2009/0109500 | A1 | | 4/2009 | Hasegawa et al. | |
| 2010/0060954 | A1 | * | 3/2010 | Ikeno et al. | ........ 358/474 |

FOREIGN PATENT DOCUMENTS

| JP | H02-131067 A | 5/1990 |
| JP | H05-80066 U | 10/1993 |
| JP | 09-284506 A | 10/1997 |
| JP | 2000-233847 A | 8/2000 |
| JP | 2002-111977 A | 4/2002 |
| JP | 2002-259724 A | 9/2002 |
| JP | 2006-065289 | 3/2006 |
| JP | 2009-135914 A | 6/2009 |

OTHER PUBLICATIONS

JP Office Action dtd Mar. 26, 2013, JP Appln. 2010-042578, English translation.
Non Final Office Action issued in U.S. Appl. No. 13/034,400, mailed May 8, 2013.
Notification of Reasons for Rejection issued in corresponding Japanese Patent Application No. 2010-042579 mailed Mar. 19, 2013.
Final Office Action issued in corresponding U.S. Appl. No. 13/034,400 mailed Dec. 4, 2013.

* cited by examiner

*Primary Examiner* — Marivelisse Santiago Cordero
*Assistant Examiner* — John Wallace
(74) *Attorney, Agent, or Firm* — Banner & Witcoff, Ltd.

(57) ABSTRACT

An image reader is provided, which includes a reference position determining unit configured to, in a state where a bright area and a dark area are formed on a reflection surface when a light projecting unit projects light toward a part of the reflection surface, receive the light reflected from the reflection surface with a light receiving portion of a reading unit while restricting a light emitting portion of the reading unit from emitting light, detect a position of the bright area and a position of the dark area in a main scanning direction, and determine a reference position in the main scanning direction based on the detected positions of the bright area and the dark area.

3 Claims, 5 Drawing Sheets

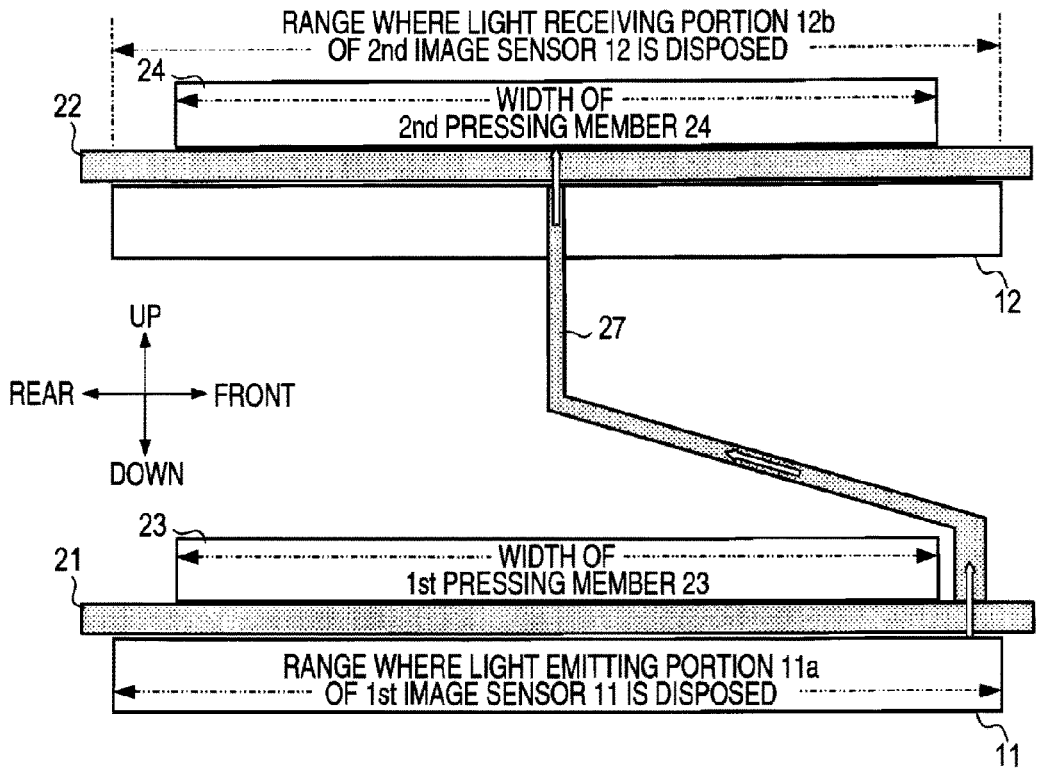
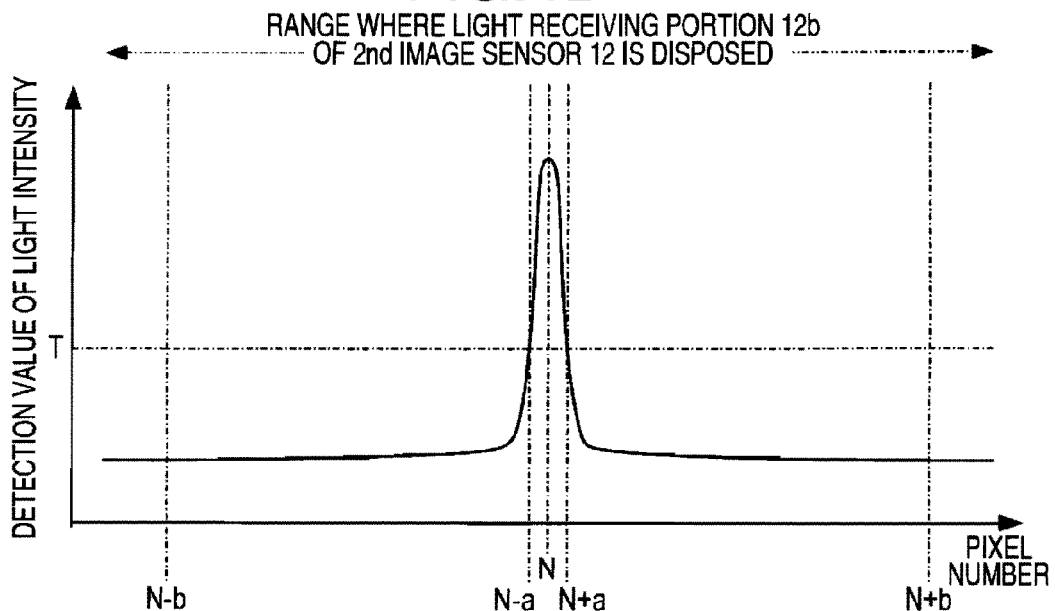

IMAGE READER

CROSS-REFERENCE TO RELATED APPLICATION

This application claims priority under 35 U.S.C. §119 from Japanese Patent Application No. 2010-042579 filed on Feb. 26, 2010. The entire subject matter of the application is incorporated herein by reference.

BACKGROUND

1. Technical Field

The following description relates to one or more image readers.

2. Related Art

In a known method, an image reader having a one-dimensional image sensor reads, with the image sensor, images of a white reference member and a black reference member that are fixedly attached to a main body of the image reader, and determines a reference position (e.g., a central position) in a main scanning direction based on the read images.

After determining the reference position, the known image reader reads an image in the main scanning direction within an effective reading range, of an entire range physically readable by the image sensor in the main scanning direction, which effective reading range is defined as a partial range within a predetermined distance from the reference position in the main scanning direction.

According to the aforementioned technique, even though the image sensor has an individual difference, it does not cause a variation in the relative positional relationship between the effective reading range and the main body of the image reader.

Specifically, this kind of image sensor has an individual difference within a predetermined tolerance with respect to the position of the light receiving portion disposed inside the image sensor. Therefore, even though an exterior portion of the image sensor is accurately positioned relative to the main body of the image reader, it is not necessarily the case that a relative positional relationship between the light receiving portion and the main body of the image reader can be optimized.

In this respect, however, when the white reference member and the black reference member are fixedly attached to the main body of the image reader with a high positional accuracy, and the reference position is determined in the main scanning direction by actually reading the white reference member and the black reference member with the image sensor, it is possible to restrain a variation in the relative positional relationship between the effective readable range and the main body of the image reader.

SUMMARY

In the case of the aforementioned known image reader, the image sensor may move to a position to read out images from the white reference member and the black reference member, which position is different from a position to read out an image from a document sheet.

Meanwhile, the image sensor may be fixed when configured to read out an image from a document sheet being conveyed with an automatic document feeder (ADF), unlike a flatbed-type image reader.

When fixed, the image reader has to inevitably read out the images from the white reference member and the black reference member in the same position as the position for reading out the image from the document sheet. Therefore, in the situation where the white reference member and the black reference member are disposed in such a position, for instance, when the document sheet is a thin see-through sheet, the image sensor might read a shadow image of the black reference member through the document sheet.

Of course, the image reader may be configured without the white reference member or the black reference member so as to avoid reading of the aforementioned shadow image of the black reference member through the document sheet. However, in this case, it is impossible to correct an error resulting from the aforementioned individual difference of the image sensor. Specifically, it is impossible to restrain the aforementioned variation in the relative positional relationship between the effective readable range and the main body of the image reader.

Namely, when the image sensor is fixed, the undesired problem might be caused regardless of whether both the white reference member and the black reference member are provided.

Aspects of the present invention are advantageous to provide one or more improved techniques for an image reader, which techniques make it possible to optimize a relative positional relationship between an effective reading range and a main body of the image reader by restraining a variation in the relative positional relationship that may result from an individual difference of an image sensor.

According to aspects of the present invention, an image reader is provided, which includes a reading unit that includes a light emitting portion configured to emit first light onto a document sheet, and a light receiving portion configured to receive the first light that is emitted by the light emitting portion and reflected from the document sheet, so as to read out an image having a plurality of pixels arranged along a main scanning direction from the document sheet, a feeder configured to feed the document sheet along a feeding path in a sub scanning direction perpendicular to the main scanning direction, a reflection surface disposed to face the reading unit across the feeding path, a light projecting unit configured to project second light toward a part of the reflection surface such that a bright area and a dark area are formed on the reflection surface, and a reference position determining unit configured to, in a state where the bright area and the dark area are formed on the reflection surface when the light projecting unit projects the second light, receive the second light reflected from the reflection surface with the light receiving portion while restricting the light emitting portion from emitting the first light, detect a position of the bright area and a position of the dark area in the main scanning direction, and determine a reference position in the main scanning direction based on the detected positions of the bright area and the dark area.

BRIEF DESCRIPTION OF THE ACCOMPANYING DRAWINGS

FIG. 4A is an illustration to show a positional relationship among a first image sensor, a second image sensor, and a light guide when viewed from a left side in the embodiment according to one or more aspects of the present invention.

FIG. 4B is a graph showing a light receiving state of the second image sensor which receives light from the light guide in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompanying drawings.

[Configuration of MFP]

Figure 1A:
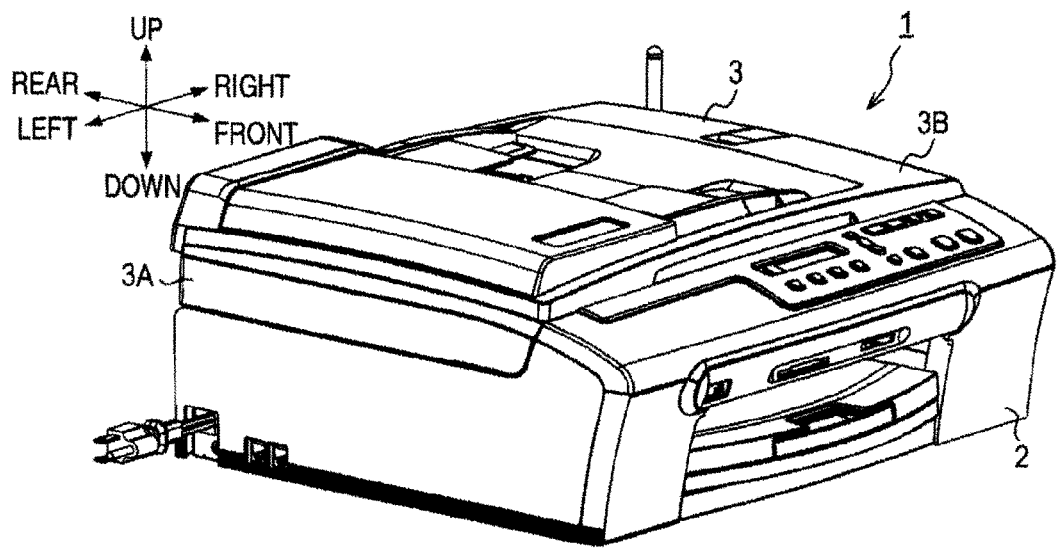
FIG. 1A is a perspective view of a multi-function peripheral (MFP) having an image reader in a state where a flatbed cover is closed in an embodiment according to one or more aspects of the present invention.
Figure 1B:
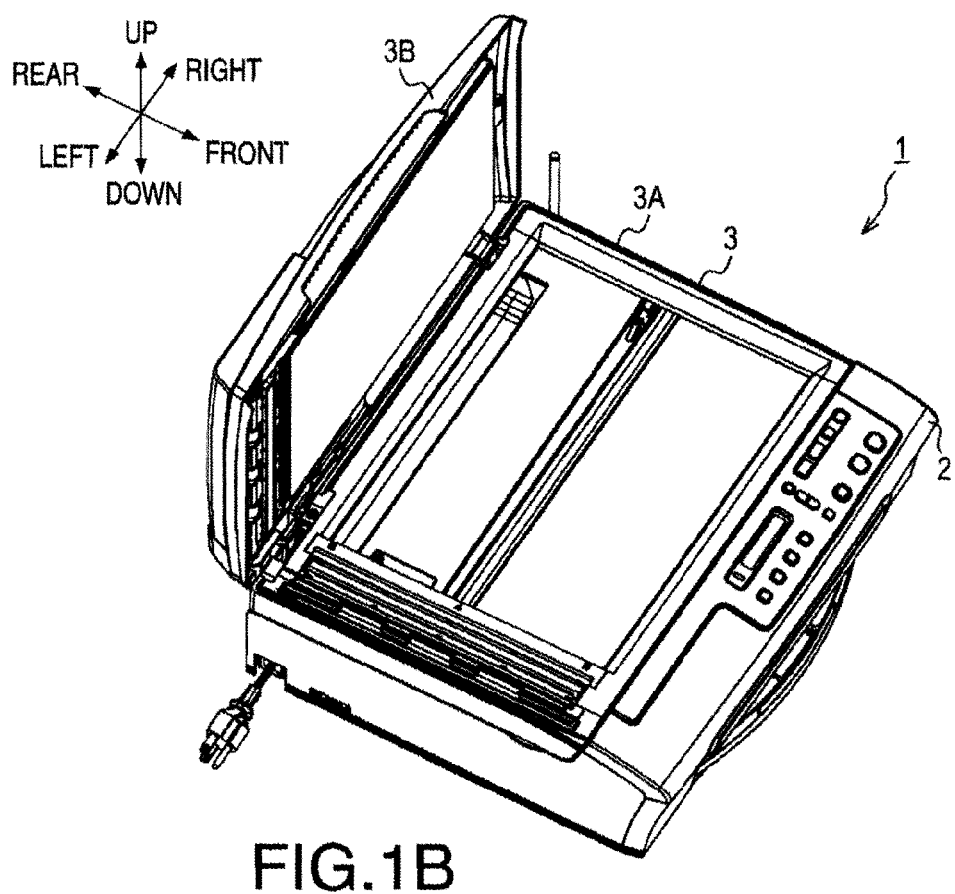
FIG. 1B is a perspective view of the MFP in a state where the flatbed cover is open in the embodiment according to one or more aspects of the present invention.

A multi-function peripheral (MFP) 1 shown in FIGS. 1A and 1B has multiple functions such as a printing function, a copy function, and a facsimile function, as well as a scanning function required for the MFP 1 to serve as an image reader. In the following description, an up-to-down direction, a left-to-right direction, and a front-to-rear direction will be defined based on the directions shown in the relevant drawings, for the sake of easy understanding of relative positional relationship among elements of the MFP 1.

The MFP 1 includes a main unit 2 and a scanning unit 3 that is disposed above the main unit 2. The scanning unit 3 is configured to be open and closed relative to the main unit 2 in response to a front end of the scanning unit 3 being turned up and down around a rear end thereof. When setting the scanning unit 3 into an open state (not shown) from a closed state shown in FIG. 1A by using the aforementioned open/closed mechanism of the scanning unit 3, a user can conduct maintenance on an internal mechanism incorporated in the main unit 2.

The scanning unit 3 includes a document table 3A configured such that a document sheet is placed thereon, and a cover 3B configured to cover an upper side of the document table 3A. The cover 3B is configured to be open and closed relative to the document table 3A when a front end thereof is turned up and down around a rear end thereof. When setting the cover 3B into an open state shown in FIG. 1B from a closed state shown in FIG. 1A by using the aforementioned open/closed mechanism of the cover 3B, the user can place the document sheet on the document table 3A.

Further, the cover 3B is configured to be displaced relative to the document table 3A in the vertical direction. This displacement mechanism is provided to the cover 3B, separately from the aforementioned open/closed mechanism. Thereby, even though a relatively thick document sheet is to be placed on the document table 3A, the document sheet can be set on the document table 3A in a state sandwiched between the document table 3A and the document cover 3B.

[Detailed Configuration of Scanning Unit]

Figure 2:
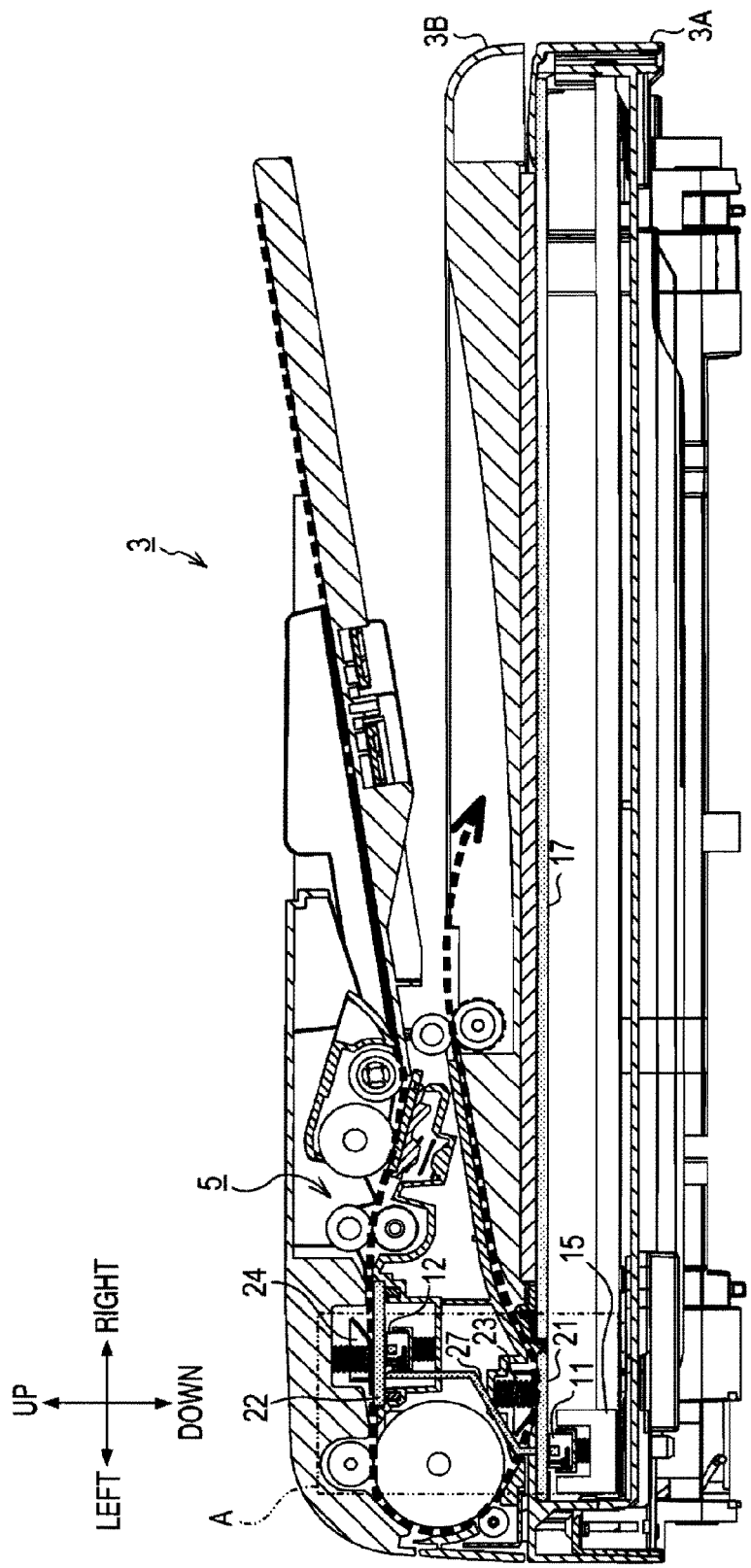
FIG. 2 is a cross-sectional side view showing an internal configuration of a scanning unit in the embodiment according to one or more aspects of the present invention.
Figure 3:
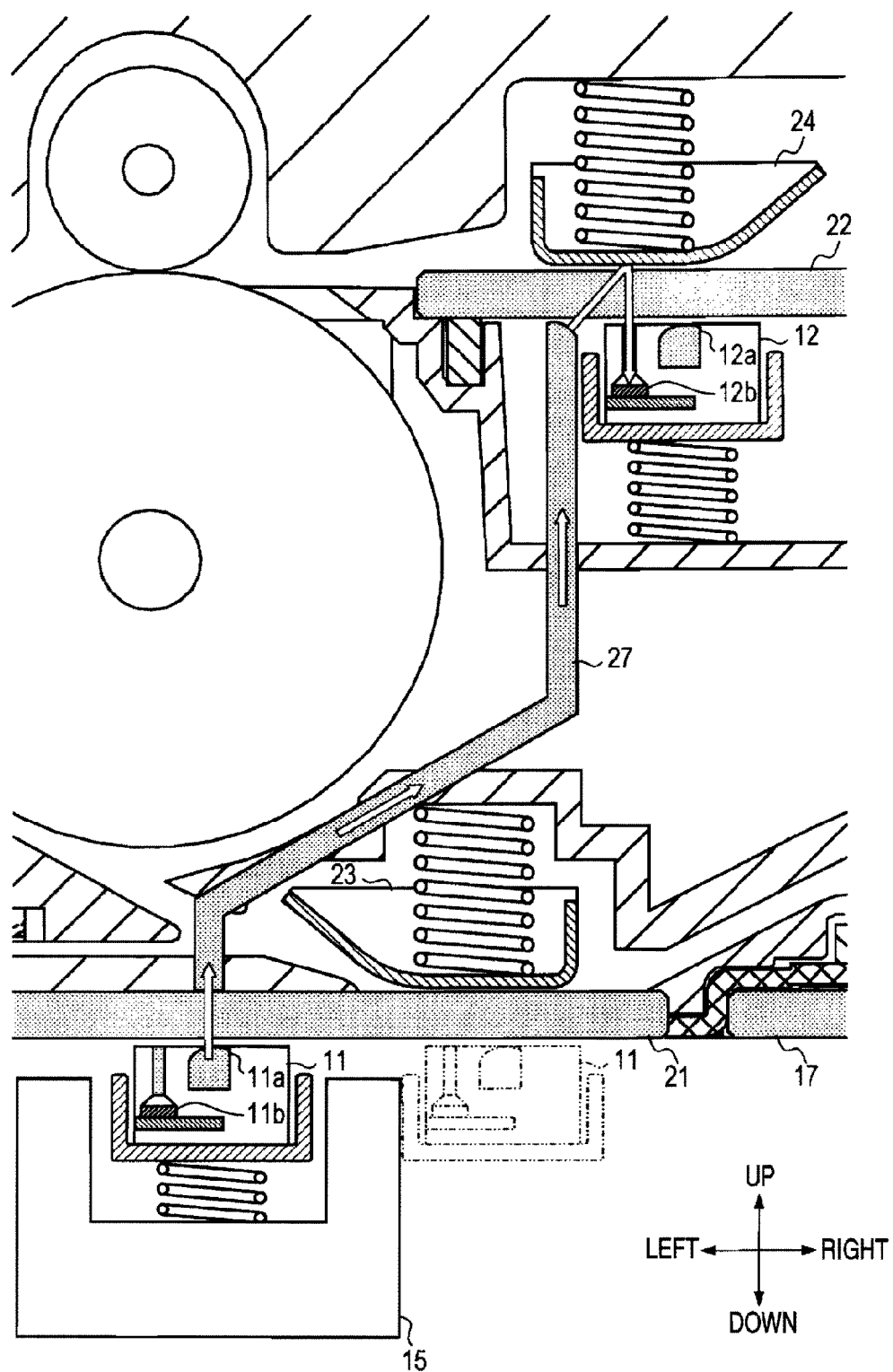
FIG. 3 is a cross-sectional side view showing in an enlarged manner a section A indicated in FIG. 2 in the embodiment according to one or more aspects of the present invention.

A detailed explanation will be provided about the scanning unit 3 with reference to FIGS. 2 and 3. The scanning unit 3 is configured with an automatic document feeder (ADF) 5 added to a flatbed (FB) scanner. Further, the scanning unit 3 includes a first image sensor 11 and a second image sensor 12. In the embodiment, each of the first and second image sensors 11 and 12 employs a contact image sensor.

The first image sensor 11 is mounted on a carriage 15 provided in the document table 3A and configured to move in the left-to-right direction together with the carriage 15. Further, there is an FB glass 17 provided above the moving path of the first image sensor 11.

When the scanning unit 3 is used as an FB scanner, the document sheet is placed on the FB glass 17. In this case, the first image sensor 11 reads an image on the document sheet by repeatedly capturing image data of a plurality of pixels aligned along a main scanning direction while moving in a sub scanning direction. It is noted that the main scanning direction is defined as the front-to-rear direction of the MFP 1, and the sub scanning direction is defined as the left-to-right direction of the MFP 1.

Additionally, in the scanning unit 3, a first ADF glass 21 is disposed in a position that is above the moving path of the first image sensor 11 and on a left side relative to the FB glass 17. A second ADF glass 22 is disposed above the second image sensor 12. A first pressing member 23 is disposed above the first ADF glass 21. A second pressing member 24 is disposed above the second ADF glass 22.

When the scanning unit 3 is used as an ADF scanner, the first image sensor 11 moves to a position (see a position indicated by a chain double-dashed line in FIG. 3) beneath the first pressing member 23 in the left-to-right direction, and stops in the position. The second image sensor 12 is disposed in a position beneath the second pressing member 24 in the left-to-right direction, and fixed in the position so as not to move therefrom in the left-to-right direction.

The document sheet, fed by the ADF 5, is conveyed along a feeding path indicated by a dashed line in FIG. 2 and passes through between the second ADF glass 22 and the second pressing member 24. At that time, the second image sensor 12 reads an image on a second side (a down-facing side at the time when the document sheet passes over the second image sensor 12) of the document sheet, by repeatedly capturing image data of a plurality of pixels aligned in the main scanning direction (i.e., the front-to-rear direction of the MFP 1) from the document sheet that is moving in the sub scanning direction (i.e., a feeding direction).

The document sheet, fed by the ADF 5, passes through between the first ADF glass 21 and the first pressing member 23 after passing through between the second ADF glass 22 and the second pressing member 24. At that time, the first image sensor 11 reads an image on a first side (a down-facing side at the time when the document sheet passes over the first image sensor 11) of the document sheet, by repeatedly capturing image data of a plurality of pixels aligned in the main scanning direction (i.e., the front-to-rear direction of the MFP 1) from the document sheet that is moving in the sub scanning direction (i.e., the feeding direction).

Namely, to read the images from both the first and second sides of the document sheet, the second image sensor 12 is controlled to start image reading earlier than the first image sensor 11. Thereafter, at the time when the document sheet reaches a position to face the first image sensor 11, the first image sensor 11 is controlled to start image reading. It is noted that the user can arbitrarily configure a setting to make a choice between double-side reading with both the first and second image sensors 11 and 12 and single-side reading with one of the first and second image sensors 11 and 12.

[Mechanism to Determine Reference Position of Second Image Sensor]

Subsequently, an explanation will be provided about a mechanism to determine a reference position of the second image sensor 12, with reference to FIGS. 3 and 4.

In the scanning unit 3, a light guide 27 is disposed in an area extending from an upper side of the first ADF glass 21 to a lower side of the second ADF glass 22. As shown in an enlarged manner in FIG. 3, the light guide 27 is configured to guide light emitted by a light emitting portion 11a of the first image sensor 11 to a light receiving portion 12b of the second image sensor 12.

Specifically, the first image sensor 11 is configured to emit, from the light emitting portion 11a, light to be incident onto the document sheet and receive light reflected from the document sheet with a light receiving portion 11b. Further, the second image sensor 12 is configured to emit, from a light emitting portion 12a, light to be incident onto the document sheet and receive light reflected from the document sheet with the light receiving portion 12b.

Accordingly, when the first image sensor 11 is controlled to move to a position where light emitted by the light emitting portion 11a is incident onto a lower end of the light guide 27 and to emit light from the light emitting portion 11a, the light is transmitted through the light guide 27 to reach an upper end of the light guide 27, as indicated by an outline arrow in FIG. 3.

Then, the light, which has reached the upper end of the light guide 27, is emitted from the upper end of the light guide 27 toward a lower surface of the second pressing member 24. Thereafter, the light, reflected from the lower surface of the second pressing member 24, is received by the light receiving portion 12b of the second image sensor 12.

Further, as shown in FIG. 4A, the lower end of the light guide 27 faces the first image sensor 11 in a position outside a width of the first pressing member 23 in the front-to-rear direction (at a front side relative to the first pressing member 23 in the front-to-rear direction). Meanwhile, the upper end of the light guide 27 faces the second pressing member 24 in a narrow range located in a center in a width direction (the front-to-rear direction in FIG. 4A) of the second pressing member 24.

Therefore, when the light receiving portion 12b performs scanning in the main scanning direction in a state where the light emitting portion 11a emits light and the light emitting portion 12a does not emit light, each pixel within a limited range in the main scanning direction, of the plurality of pixels read by the light receiving portion 12b, has a light intensity higher than a predetermined threshold T, as shown in FIG. 4B. In the limited range, the light, which is emitted by the light emitting portion 11a, transmitted through the light guide 27, and emitted from the upper end of the light guide 27, is received by the light receiving portion 12b.

Namely, when the light emitting portion 11a is set ON and the light emitting portion 12a is set OFF, a bright area where the light intensity is higher than the threshold T is formed around a center of the lower surface of the second pressing member 24 in the main scanning direction. Further, a dark area where the light intensity is equal to or lower than the threshold T is formed at each side of the bright area in the main scanning direction. The respective positions of the bright area and the dark areas are read by the light receiving portion 12b.

The upper end of the light guide 27 is positioned as designed with a high accuracy depending on a design accuracy for the scanning unit 3. Therefore, the bright area, onto which the light is incident from the upper end of the light guide 27, is positioned as designed for the scanning unit 3. Further, a relative positional relationship between the bright area and the ADF 5 provided to the scanning unit 3 is as designed.

Meanwhile, the position the light receiving portion 12b of the second image sensor 12 varies within a tolerance in the main scanning direction, owing to an individual difference of the second image sensor 12. Therefore, when the bright area is read by the light receiving portion 12b, an upper limit and a lower limit of the pixel numbers in the bright area may be misaligned by an amount corresponding to the individual difference of the second image sensor 12.

In this respect, however, it is noted that by obtaining such a pixel number "N" that the lower limit and the upper limit of the bright area have a pixel number "N−a" and "N+a," respectively, it is possible to determine a pixel number (i.e., the pixel number "N") corresponding to the center of the bright area. Accordingly, when an effective reading range is defined as a range between a pixel number "N−b" and a pixel number "N+b" with the pixel number "N" as a reference position (origin), a relative positional relationship between the effective reading range and the bright area is definitely determined regardless of the individual difference of the second image sensor 12.

Thus, when reading an image with the second image sensor 12, by reading the image in the effective reading range of the entire width of the light receiving portion 12b in the main scanning direction, the MFP 1 can read the image in a range definitely positioned relative to the scanning unit 3.

When a position where the second image sensor 12 is attached may vary, it is preferable to always perform the process to determine the effective reading range. However, when the second image sensor 12 is unchangeably positioned, the process to determine the effective reading range needs to be performed only once. In this case, when the effective reading range is stored on a nonvolatile memory, it is possible to use the effective reading range in reading the image with the second image sensor 12, by reference to the nonvolatile memory.

[Control System of MFP]

Figure 5:
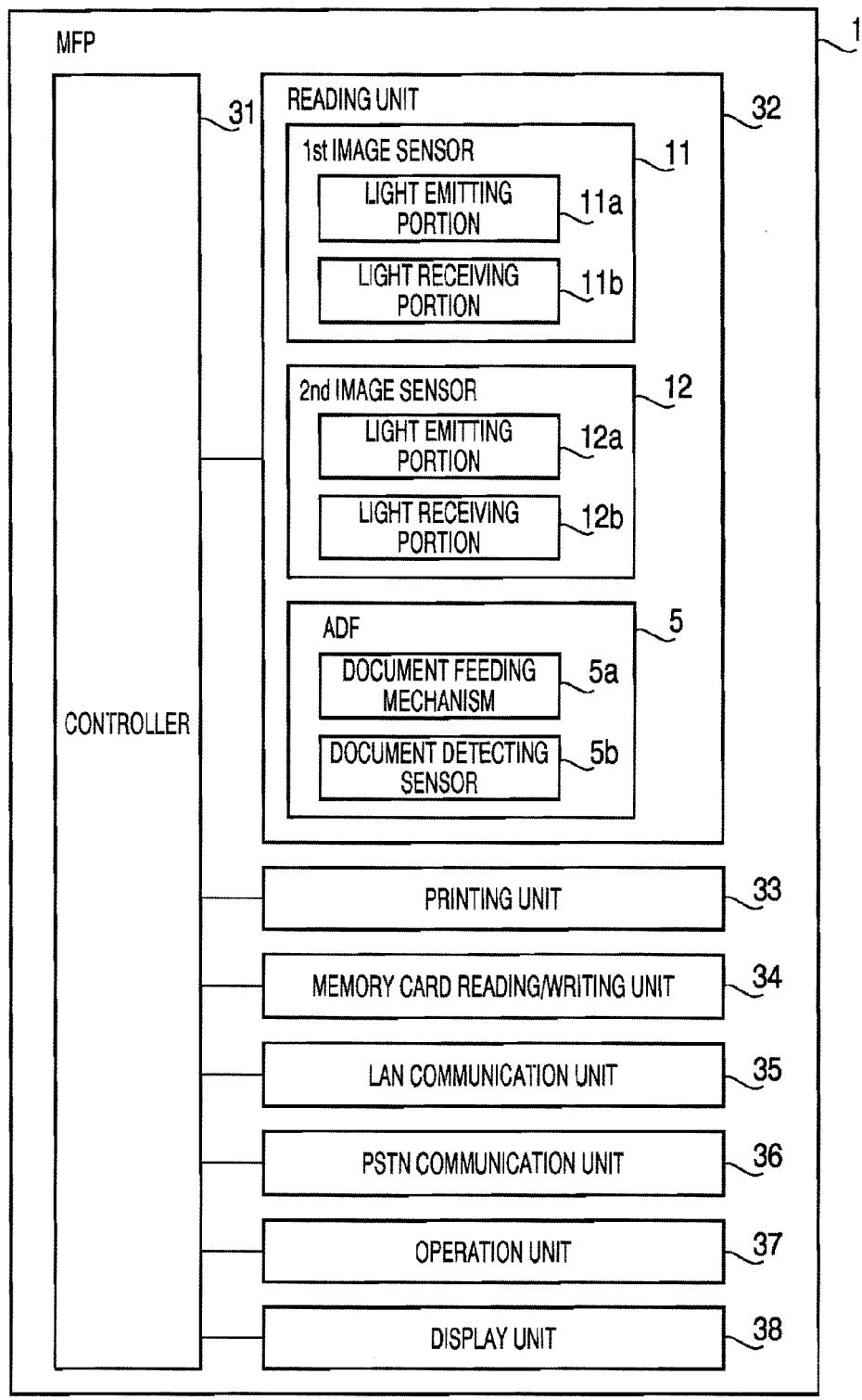
FIG. 5 is a block diagram showing a control system of the MFP in the embodiment according to one or more aspects of the present invention.

Subsequently, a control system of the MFP 1 will be described with reference to FIG. 5. The MFP 1 includes a controller 31, a reading unit 32, a printing unit 33, a memory card reading/writing unit 34, a LAN communication unit 35, a PSTN communication unit 36, an operation unit 37, and a display unit 38.

The controller 31 includes known elements such as a CPU, a ROM, and a RAM. The CPU of the controller 31 takes control of each elements included in the MFP 1 when running control programs stored on the ROM or the RAM. It is noted that operational control of each elements included in the MFP 1 and necessary processes are implemented by the controller 31 to determine the reference position of the second image sensor 12.

The reading unit 32 is configured to read an image on a document sheet and provided with the already-described first image sensor 11, second image sensor 12, and ADF 5. The ADF 5 includes a document feeding mechanism 5a configured to feed document sheets along the feeding path on a sheet-by-sheet basis, and a document detecting sensor 5b configured to detect whether there is a document set on the ADF 5.

The printing unit 33 is configured with a printing mechanism employing an electrophotographic technique or an ink-jet technique. In the copy function of the MFP 1, the printing unit 33 is used to print an image read by the reading unit 32.

Further, in the facsimile function of the MFP 1, the printing unit 33 is used to print an image received via facsimile communication.

The memory card reading/writing unit 34 is configured to, when a removable medium such as a memory card and a USB memory is attached thereto, read data from the removable medium and/or write data onto the removable medium.

The LAN communication unit 35 is configured with a communication interface device complying with a wireless LAN and a communication interface device complying with a wired LAN. Through the LAN communication unit 35, the MFP 1 can perform data communication with a device via a LAN.

The PSTN communication unit 36 is configured with various devices, such as a facsimile modem and an audio CODEC, which are necessary for connection with a public switched telephone networks (PSTN). Through the PSTN communication unit 36, the MFP 1 can communicate with a device (e.g., a facsimile machine) via the PSTN. For instance, when the user uses the facsimile function of the MFP 1, transmission/reception of data is carried out via the PSTN communication unit 36.

The operation unit 37 is an input device which the user operates when providing various commands to the MFP 1, and includes a touch panel, various buttons, and switches. The display unit 38 is an output device configured to notify the user about an operational status of the MFP 1, and includes a liquid crystal display (LCD) device.

[Effects]

As described above, in the MFP 1, by employing the light guide 27, it is possible to form the bright area and the dark area on the lower surface of the second pressing member 24. Then, by reading the bright area and the dark area with the second image sensor 12, it is possible to determine the reference position (the pixel number "N" in the embodiment) and the effective reading range (the range between the pixel number "N−b" and the pixel number "N+b" in the embodiment) in the main scanning direction.

Accordingly, in the main scanning direction, it is possible to read the image in the effective reading range that is definitely positioned relative to the scanning unit 3 regardless of the individual difference of the second image sensor 12.

Further, to determine the reference position, the MFP 1 forms the bright area and the dark area by employing the light guide 27, instead of reading a white reference member and a black reference member with the second image sensor 12 in a known manner.

Therefore, the MFP 1 of the embodiment does not need a white reference member or a black reference member as used in a known method. Hence, the MFP 1 of the embodiment does not need any space for placing a white reference member and a black reference member. In addition, the MFP 1 of the embodiment does not need any mechanism to move the second image sensor 12 to a position where a white reference member and a black reference member are disposed. Thus, the second image sensor 12 may be configured to be immovable. In this case, it is possible to simplify the configuration around the second image sensor 12 and reduce a manufacturing cost of the MFP 1.

It is noted that a white reference member and a black reference member may be disposed in a position where the second image sensor 12 can read them. In this case, however, the white reference member and the black reference member might be seen through a thin document sheet from the side of the second image sensor 12 when the MFP 1 reads the document sheet with the second image sensor 12. It might cause undesired images in the read image that result from the white reference member and the black reference member.

On the contrary, in the MFP 1 of the embodiment, the lower surface of the second pressing member 24 can be configured with a single color (e.g., white color). Thus, even in reading a thin document sheet, it is possible to avoid the problem resulting from the white reference member and the black reference member.

Further, the MFP 1 of the embodiment uses the light emitting portion 11a of the first image sensor 11 as a light source of the light to be emitted from the light guide 27. Accordingly, it is possible to reduce the number of components relatively in comparison with a case where a dedicated light source is provided separated from the light emitting portion 11a of the first image sensor 11.

Further, according to the MFP 1 of the embodiment, the first image sensor 11 includes a portion that is located outside the width of the first pressing member 23 in the main so as not to face the first pressing member 23. In a position above the portion of the first pressing member 23, the lower end of the light guide 27 is disposed.

Hence, it is possible to prevent the first pressing member 23 from blocking the light emitted by the light emitting portion 11a of the first image sensor 11 toward the lower end of the light guide 27. Thus, it is possible to easily introduce the light into the light guide 27, unlike a case where the first pressing member 23 overlaps the first image sensor 11 over the entire length of the first image sensor 11 in the main scanning direction.

Further, according to the MFP 1 of the embodiment, the lower surface of the second pressing member 24 serves as a reflection surface that reflects the light from the light guide 27. Thus, it is possible to simplify the configuration around the second pressing member 24 and reduce the number of components relatively in comparison with a case where a dedicated member having a reflection surface is provided separated from the second pressing member 24.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications may be feasible.

In the aforementioned embodiment, the second image sensor 12 is disposed upstream relative to the upper end of the light guide 27 in the feeding direction for the document sheet. However, the second image sensor 12 may be disposed downstream relative to the upper end of the light guide 27 in the feeding direction for the document sheet.

The light guide 27 may be formed from transparent hard resin such as acrylic resin or a flexible member such as an optical fiber. Alternatively, the light guide 27 may include one or more mirrors to reflect and introduce the light in a predetermined direction.

In the aforementioned embodiment, the immovable second image sensor 12 is disposed upstream relative to the movable first image sensor 11 in the feeding direction for the document sheet. However, the positional relationship between the first and second image sensors 11 and 12 may be changed. For instance, even when the positional relationship between the first and second image sensors 11 and 12 is the same as shown in the aforementioned embodiment and the feeding direction for the document sheet is reversed, aspects of the present invention may be applied.

In the aforementioned embodiment, the first image sensor 11 is movable such that the MFP 1 can be used as a flatbed scanner. However, the first image sensor 11 may be configured to be immovable. In other words, the MFP 1 may be configured as an ADF scanner for double-side reading that cannot be used as a flatbed scanner.

In this case, when a reference position and an effective reading range for the first image sensor 11 are determined using a white reference member and a black reference member, the aforementioned problems might be caused. Thus, the reference position and the effective reading range for the first image sensor 11 may be determined in the same manner as the second image sensor 12. Specifically, for instance, the reference position and the effective reading range for the first image sensor 11 may be determined by reading a bright area that is formed using a light guide configured to guide light from the light emitting portion 12a of the second image sensor 12 to the light receiving portion 11b of the first image sensor 11, in substantially the same manner as described in the aforementioned embodiment.

Under the assumption that the two image sensors are provided, the aforementioned embodiment has been described in which the light is guided from the light emitting portion of one of the two image sensors to the light receiving portion of the other image sensor. However, aspects of the present invention may be applied to a configuration having a single image sensor.

Specifically, when there is only a single image sensor provided, a bright area may be formed using a light source other than the image sensor, and a reference position and an effective reading range may be determined by reading the bright area with the light receiving portion of the image sensor.

Further, when two image sensors are provided, a bright area may be formed using a light source other than the two image sensors. Namely, the light source for forming the bright area may arbitrarily be selected between a light source other than the image sensors or a light emitting portion of one of the image sensors. It is noted that when the light emitting portion of one of the image sensors is employed as the light source for forming the bright area, none of an additional light source and an electric circuit therefor is needed. Thus, in order to simplify the configuration of the MFP 1, it is preferable to employ the light emitting portion of one of the image sensors.

In the aforementioned embodiment, as an image reader according to aspects of the present invention, the MFP 1 having functions other than the function of the image reader is exemplified. However, aspects of the present invention may be applied to an image scanner having a single function, i.e., an image reading function.

What is claimed is:

1. An image reader comprising:
a first-side reading unit including:
a first-side light emitting portion configured to emit first light onto a first side of a document sheet; and
a first-side light receiving portion configured to receive the first light emitted by the first-side light emitting portion and reflected from the first side of the document sheet, so as to read out an image having a plurality of pixels arranged along the main scanning direction from the first side of the document sheet,
a second-side reading unit including:
a second-side light emitting portion configured to emit second light onto a second side of the document sheet; and
a second-side light receiving portion configured to receive the second light emitted by the second-side light emitting portion and reflected from the second side of the document sheet, so as to read out an image having a plurality of pixels arranged along the main scanning direction from the second side of the document sheet,
a feeder configured to feed the document sheet along a feeding path in a sub scanning direction perpendicular to the main scanning direction;
a reflection surface disposed to face the second-side reading unit across the feeding path;
a light projecting unit configured to project second light toward a part of the reflection surface such that a bright area and a dark area are formed on the reflection surface, wherein the light projecting unit comprises a light guide having a first end facing the first-side light emitting portion and a second end, and wherein the light guide is configured to guide therethrough light incident onto the first end to the second end, so as to project the guided light as the second light from the second end toward the part of the reflection surface;
a reference position determining unit configured to, in a state where the bright area and the dark area are formed on the reflection surface when the light projecting unit projects the second light:
receive the second light reflected from the reflection surface with the light receiving portion while restricting the light emitting portion from emitting the first light,
detect a position of the bright area and a position of the dark area in the main scanning direction, and
determine a reference position in the main scanning direction based on the detected positions of the bright area and the dark area; and
a first pressing member disposed to face the first-side reading unit across the feeding path, the first pressing member being configured to press the document sheet toward the first-side reading unit so as to prevent the document sheet from being lifted up apart from the first-side reading unit,
wherein the first-side light emitting portion comprises a first section and a second section in the main scanning direction, the first section being located in an area within a width of the first pressing member in the main scanning direction, the second section being located in an area outside the width of the first pressing member in the main scanning direction, and
wherein the light guide is disposed such that the first end thereof faces the second section in a position outside the width of the first pressing member in the main scanning direction and that light emitted from the second section of the first-side light emitting portion is incident onto the first end of the light guide.

2. The image reader according to claim 1, further comprising a second pressing member disposed to face the second-side reading unit across the feeding path, the second pressing member being configured to press the document sheet toward the second-side reading unit so as to prevent the document sheet from being lifted up apart from the second-side reading unit,
   wherein the second pressing member comprises the reflection surface.
3. The image reader according to claim 1,
   wherein the second-side reading unit is immovable in the sub scanning direction.

\* \* \* \* \*